United States Patent
Pedersen

(10) Patent No.: US 7,945,276 B2
(45) Date of Patent: May 17, 2011

(54) METHODS AND TERMINAL DEVICES

(75) Inventor: Jens Ulrik Pedersen, Noerresundby (DK)

(73) Assignee: Siemens Aktiengesellschaft, Munich (DE)

( * ) Notice: Subject to any disclaimer, the term of this patent is extended or adjusted under 35 U.S.C. 154(b) by 986 days.

(21) Appl. No.: 10/516,758

(22) PCT Filed: Jul. 7, 2004

(86) PCT No.: PCT/EP2004/007447
§ 371 (c)(1),
(2), (4) Date: Dec. 3, 2004

(87) PCT Pub. No.: WO2006/002681
PCT Pub. Date: Jan. 1, 2006

(65) Prior Publication Data
US 2006/0234723 A1 Oct. 19, 2006

(51) Int. Cl.
*H04B 7/00* (2006.01)
(52) U.S. Cl. ............. 455/518; 455/517; 455/456.1; 455/414.1; 455/457
(58) Field of Classification Search .......... 455/456.1, 455/517, 414.1, 404.2, 518, 457
See application file for complete search history.

(56) References Cited

U.S. PATENT DOCUMENTS

| | | | |
|---|---|---|---|
| 5,493,286 A | 2/1996 | Grube et al. | |
| 6,285,281 B1* | 9/2001 | Gatto | 340/539.26 |
| 6,721,537 B1 | 4/2004 | Briesemeister | |
| 7,142,900 B1* | 11/2006 | Straub | 455/701 |
| 2003/0016804 A1* | 1/2003 | Sheha et al. | 379/201.06 |
| 2003/0100326 A1* | 5/2003 | Grube et al. | 455/515 |
| 2004/0203907 A1* | 10/2004 | Hiller et al. | 455/456.1 |
| 2005/0141541 A1* | 6/2005 | Cuny et al. | 370/437 |
| 2005/0153724 A1* | 7/2005 | Vij et al. | 455/518 |
| 2005/0228895 A1* | 10/2005 | Karunamurthy et al. | 709/229 |
| 2005/0288036 A1* | 12/2005 | Brewer et al. | 455/456.2 |
| 2007/0117552 A1* | 5/2007 | Gobburu et al. | 455/414.1 |

FOREIGN PATENT DOCUMENTS

TW 588160 5/2004

* cited by examiner

*Primary Examiner* — Ajit Patel
*Assistant Examiner* — Khai M Nguyen
(74) *Attorney, Agent, or Firm* — King & Spalding L.L.P.

(57) ABSTRACT

A method and terminal device are provided which effect the steps of receiving a message indicating that a user of another terminal device has pressed a talk button, the message including a geographical location of the other terminal device, or any information derived therefrom; and indicating the geographical location of the other terminal device to a user of the terminal device. A further method and terminal device are provided which effect the steps of: in response to a user of a terminal device pressing a talk button, writing information describing the geographical location of the terminal device, or any information derived therefrom, into a message; and sending the message to another terminal device or to a communications network.

10 Claims, 6 Drawing Sheets

METHODS AND TERMINAL DEVICES

BACKGROUND OF THE INVENTION

Push-to-Talk over Cellular, PoC, is a relatively new service offered in some cellular networks, and has gradually gained more success on the market. In PoC, one subscriber can transmit speech to another subscriber or a group of subscribers simply by pressing a speak button. The transmission is half-duplex only; i.e., only one party can speak at a time.

The communication channel between the parties of the conversation is usually a packet-switched communication channel which is preferably established at the very beginning of the service. As a consequence, a speech message, having speech coded at the terminal device, usually can be transferred almost instantaneously without an annoying delay due to the establishment of the packet switched communication channel between the individual speech messages that are to be transmitted.

A user receiving a Push-to-Talk over Cellular message cannot know the geographical location of the talking party without asking it from the speaker, which is time-consuming and, when PoC is used as a group service, can be annoying to the others who then hear the reply as well.

SUMMARY OF THE INVENTION

The present invention is therefore directed toward enabling a party of a conversation to obtain location information of another party in a convenient way.

If the geographical location information is received at a terminal in a message that indicates that a user of another terminal device has pressed a talk button, it is clearly advantageous that one party of the conversation does not need to ask the other party about his or her whereabouts. Furthermore, the geographical location information may become important for the recipient only at the point when the user of the other terminal device is going to say or is saying something, and has therefore pressed the talk button. In this manner, it can be ensured that the user obtains the geographical location when he or she needs it or has any interest in it, not too early or not too late.

Indicating the geographical location can be performed in many ways. This is particularly useful if the geographical location is indicated to the user of the terminal device in relation to his or her own geographical location. This helps the party receiving the speech message to sense the direction where the speech is actually coming from. This may improve the user's feeling of mutual understanding, or help to locate the other user in a crowded area. Particularly advantageous embodiments for carrying out this feature are: indicating a direction of the terminal device from the geographical location of the other terminal device; indicating a distance of the terminal device from the other terminal device; indicating the geographical location of the terminal device on a map together with the location of the other terminal device; and indicating the coordinates of the terminal device as well as those of the other terminal device.

If the geographical location information is written into a message that is transmitted to another terminal device either directly or via a network, it is advantageous that one party of the conversation does not need to tell the other party about his or her whereabouts.

Nevertheless, in order to avoid privacy problems and any conflicts with the legislator in some countries, it may become necessary to enable user control over the decision whether or not geographical location information may be sent.

Therefore, by setting a parameter controllable by a user of the terminal device, sending the geographical location information can be disabled or enabled. In this manner, it is also possible to use, for example, the PoC service without revealing the address.

Furthermore, if the parameter controllable by a user of the terminal device shows that the geographical location may be indicated to another device to which the message, or any message derived therefrom, is going to be sent, partial anonymity can be guaranteed. In this manner, for example, parents may ensure that the child's geographical location is transmitted to parents and/or trusted friends only, but not to unknown people that might cause harm to the child.

Common to all embodiments of the present invention is that if the message is a message that would, in any case, be sent to the other party, some traffic can be avoided since no dedicated geographical location messages need to be transmitted any more.

If the present invention is used in connection with PoC, such messages are then preferably Push-to-Talk over Cellular messages. Some special cases of these messages are a REFER message, a Floor taken message, or a Talk burst, since they are sent, in any case, if a speech message is transmitted between two terminal devices.

Additional features and advantages of the present invention are described in, and will be apparent from, the following Detailed Description of the Invention and the Figures.

BRIEF DESCRIPTION OF THE FIGURES

FIG. 5 is another model case for PoC.

Same reference numerals refer to similar elements throughout 10 the Figures.

DETAILED DESCRIPTION OF THE INVENTION

Figure 1A:
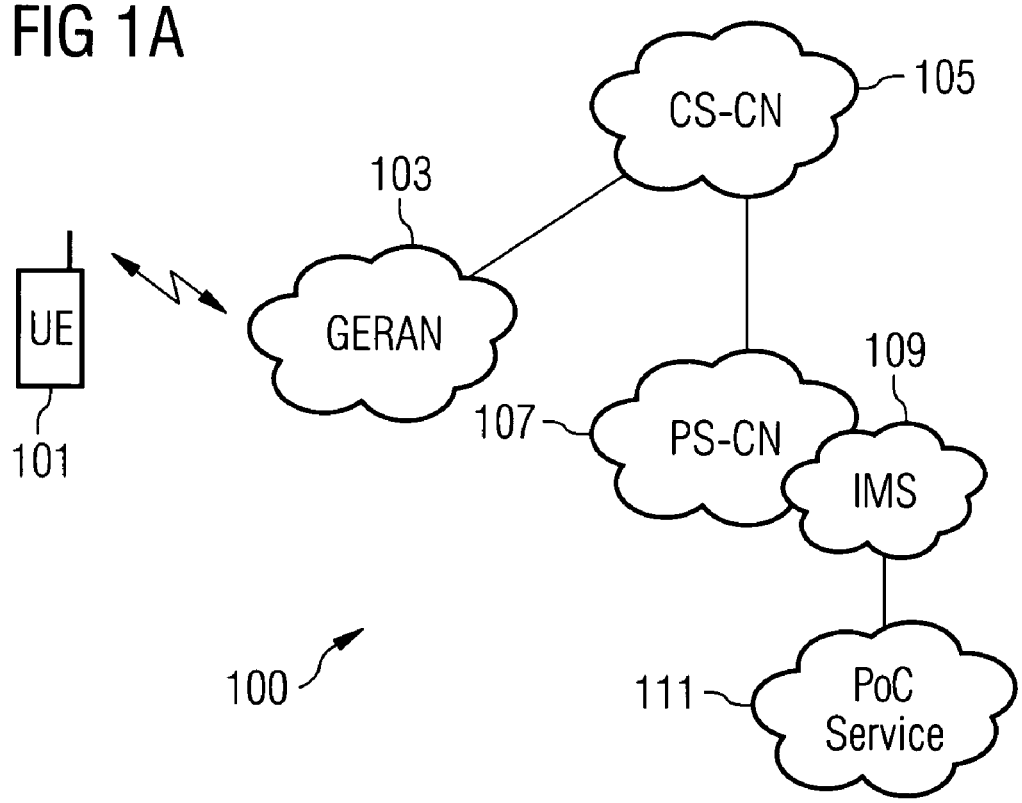
FIG. 1A shows a modern network architecture for enabling a PoC service.

FIG. 1A shows a modern network architecture for enabling the PoC service. A terminal device 101, sometimes denoted as user equipment, such as a mobile terminal or a portable digital assistant, can be in wireless connection with a communications network 100 or with another terminal device.

The communications network 100 may include a GSM/EDGE Radio Access Network 103 which is further connected to a Circuit-Switched Core Network 105 and a Packet-Switched Core Network 107. The latter is further connected to an IP-based Multimedia Subsystem IMS 109 which resembles, more or less, the Internet. The PoC service can be located in the Internet 111 or in any IP-based network.

Figure 1B:
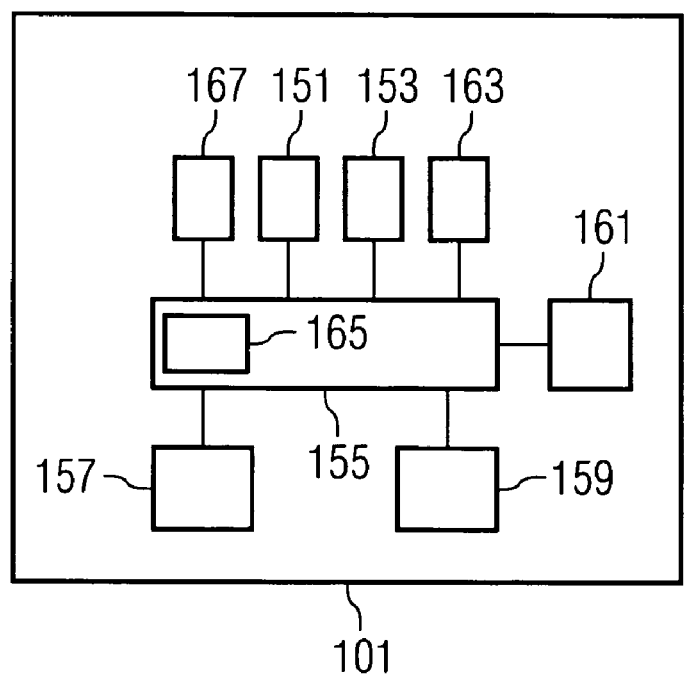
FIG. 1B shows a simplified functional block diagram of a terminal device.

FIG. 1B shows a simplified functional block diagram of a terminal device 101. The terminal device 101 includes receiving part 151, transmitting part 153, processing unit 155, memory 161, voice input part 157 and voice output part 159, visual indication part 163, and push button 167. The processing unit can run application 165 for offering the PoC service. The receiving part 151 and the transmitting part 153 may enable the terminal device 101 to be in communication with the communications network 100 or with another terminal device.

An example of the voice input part 157 is a microphone, and an example of the voice output part 159 a loudspeaker. A skilled person appreciates that some fundamental components (e.g., rechargeable battery or any other energy source, amplifiers, antennas, etc.) have been omitted from FIG. 1B for clarity. These features are nevertheless rather well known per se such that omitting them does not make understanding the present invention any more difficult.

Figure 2:
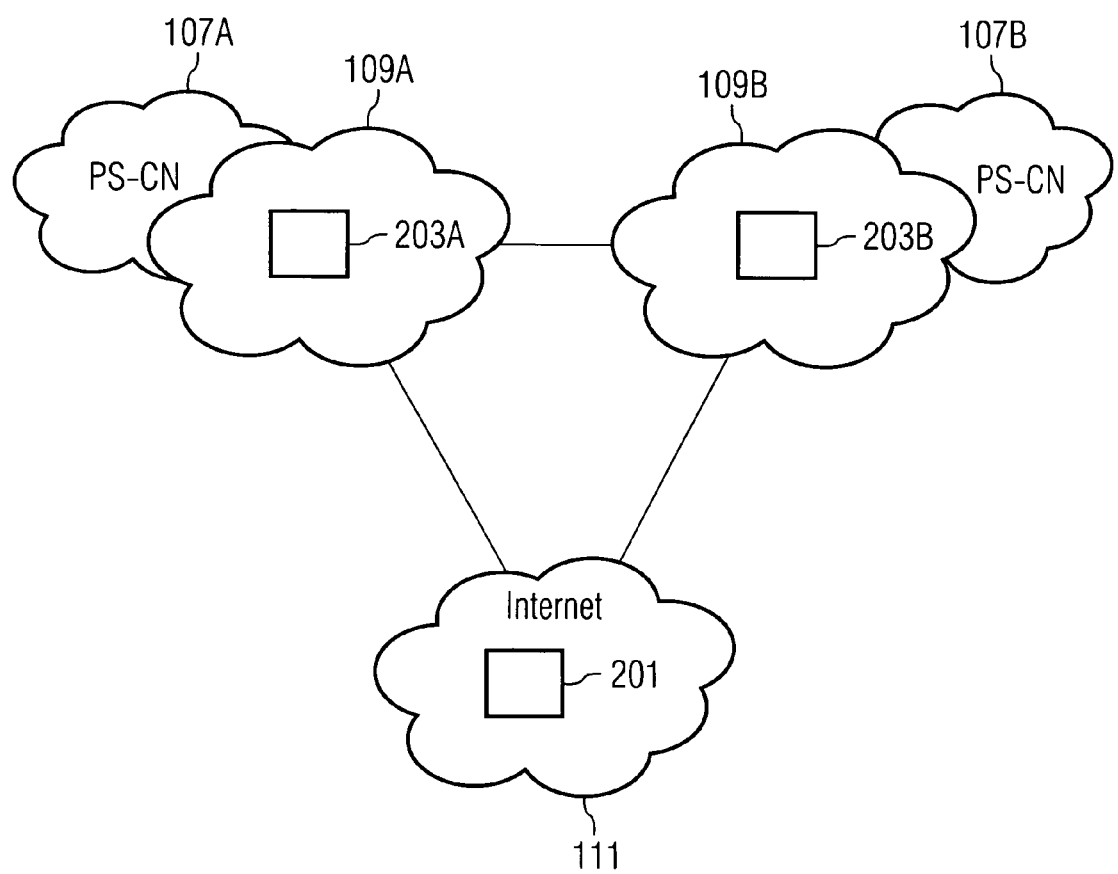
FIG. 2 illustrates the implementation of a PoC service.

FIG. 2 illustrates the implementation of the PoC service. The Packet-Switched Core Network 107A, through which the terminal device 100 can have its connections, is connected to the IMS 109A Most messages are routed via IMS core 203A. The PoC server 201 can be in the Internet 111.

Another terminal device can be connected either to the same Packet-Switched Core Network 107A or to another Packet-Switched Core Network 107B; e.g., of another communications network 100B. The Packet-Switched Core Network 107B is connected to the IMS 109B which further includes IMS Core 203B. The IMS 109A may communicate with the IMS 109B either directly or via the Internet 111.

Figure 3:
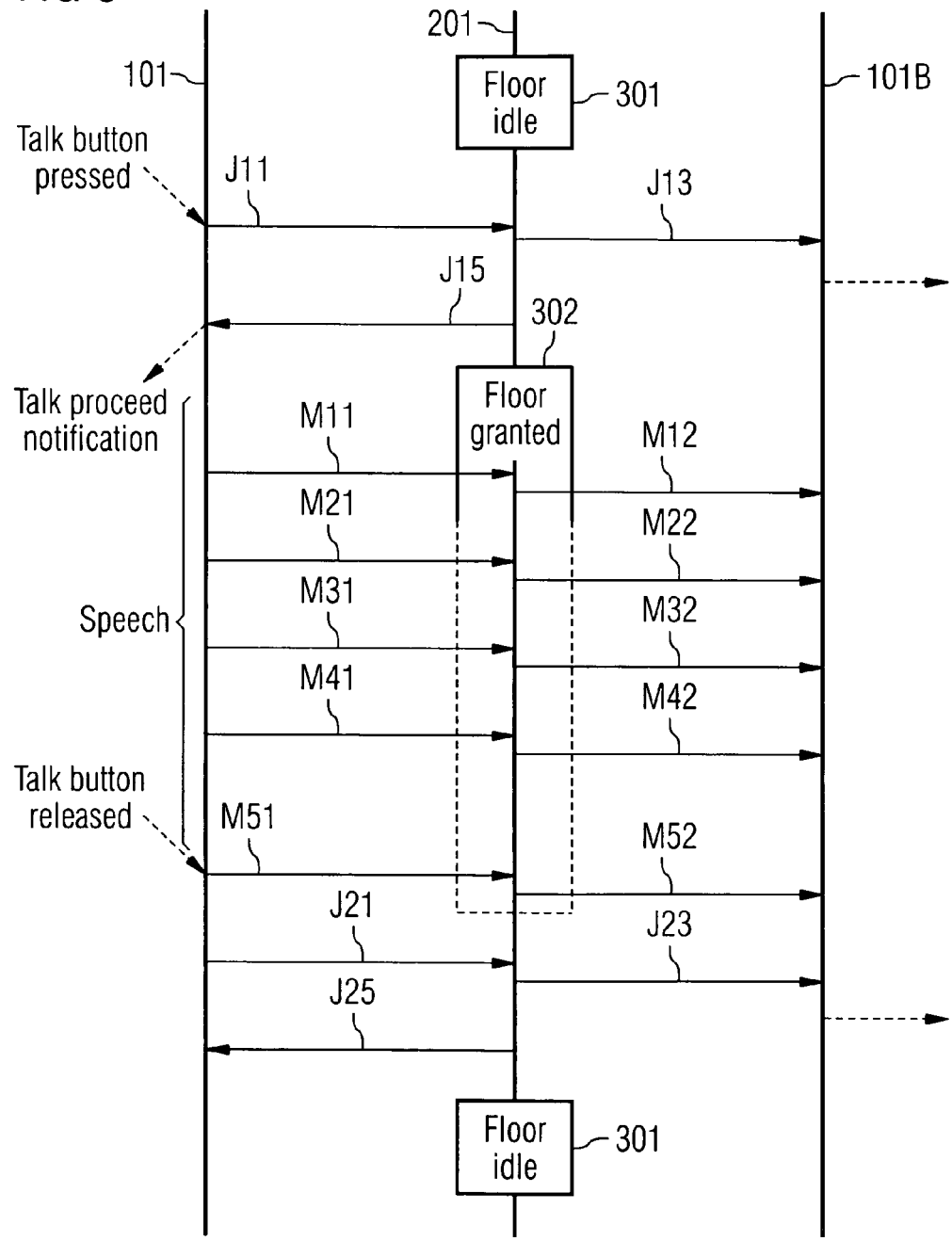
FIG. 3 shows an exemplary signalling diagram for PoC.

FIG. 3 shows an exemplary signalling diagram for PoC. The user at the terminal device 101 presses the talk button 167. The terminal device 101 sends a request to the PoC server 201 which is in "Floor Idle" state (step 301). The PoC server 201 notifies the other terminal device 101B by sending a notification J13, grants the floor and notifies the terminal device 101 by sending an acknowledgement J15. Then the terminal device 101 signals the user Talk proceed-notification; e.g., by alerting the user with voice output part 159. The user starts speaking, and speech received by the voice input part 157 is coded and transmitted in packets M11, M21, M31, M41, ..., M51 to the PoC server 201 which further forwards the messages to the other terminal device 101B as packets M12, M22, M32, M42, ..., M52.

The user can speak as long as the talk button 167 is pressed. After releasing the talk button 167, the terminal device 101 signals the release of the talk button to the PoC server 201 by sending a message J21. The PoC server 201 notifies the other terminal device 101 by sending a message J23, and then sends an acknowledgement J25 to the terminal device 101. Then, the PoC server 201 returns to the Floor Idle state, as designated at step 301.

Figure 4:
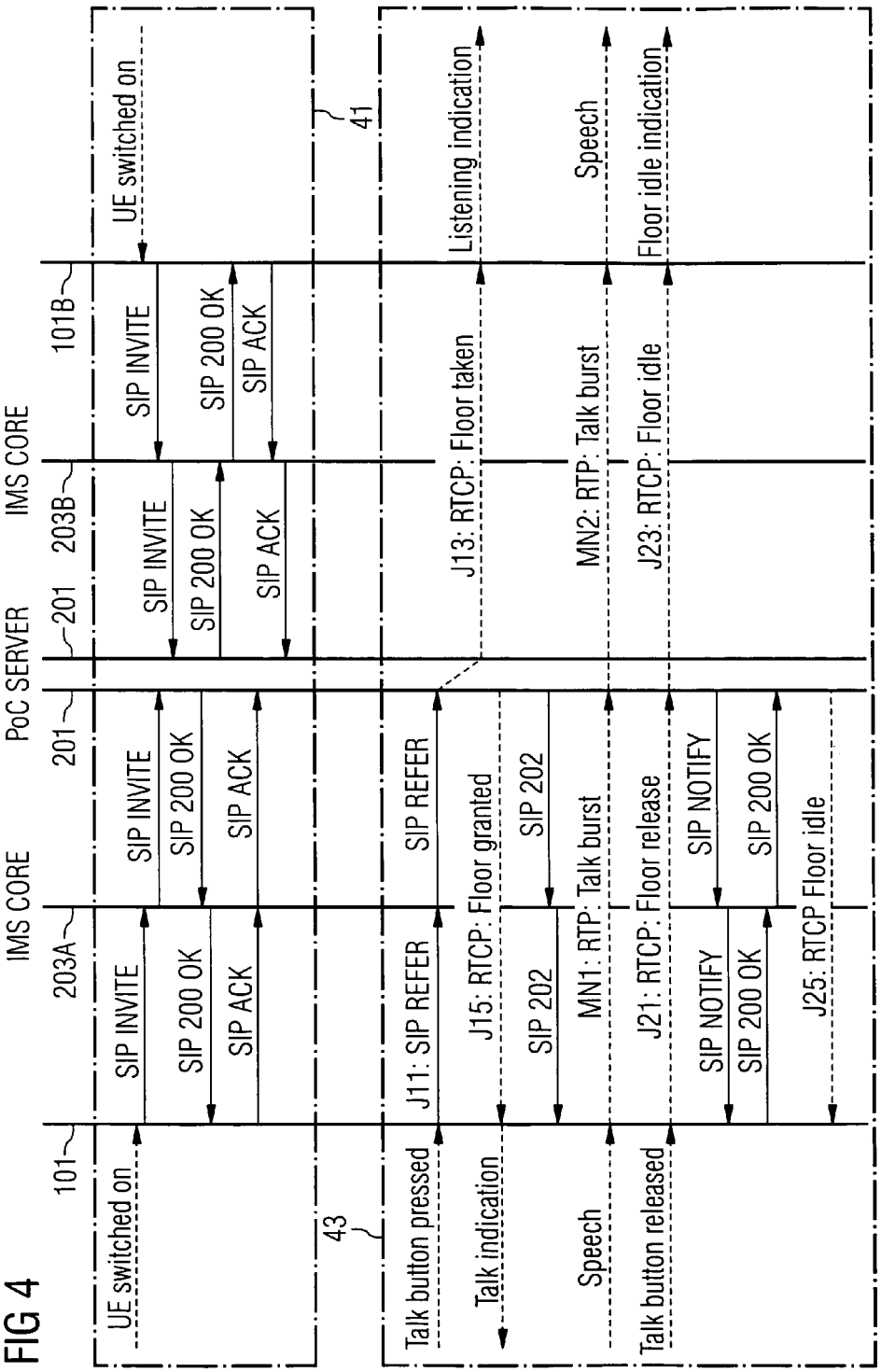
FIGS. 4 and 5 show more detailed signalling diagrams for PoC.
Figure 5:
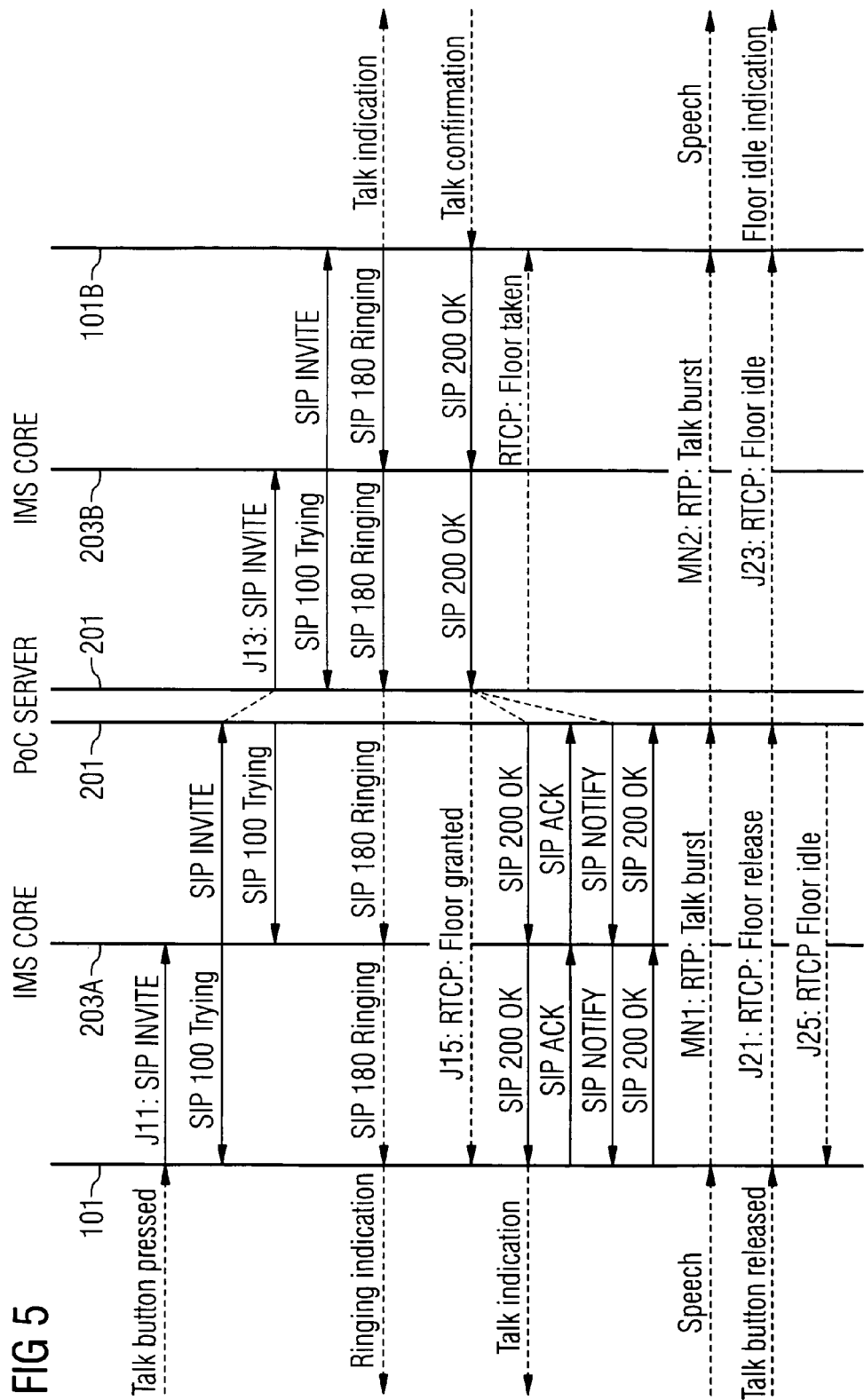

FIGS. 4 and 5 show more detailed signalling diagrams for PoC.

FIG. 4 shows a case where both terminal devices have enabled so-called early session and automatic answer.

Dashed box 41 shows how a session is created. When terminal device 101 is switched on, it sends an SIP INVITE message to the IMS core 203A which further forwards the message to PoC server 201, which responds with SIP 200 OK that is forwarded by the IMS core 203A to the terminal device 101. The terminal device 101 responds with an acknowledgement SIP ACK. The other terminal 101B performs similar messaging with the PoC server 201.

Dashed box 43 shows how a PoC is then used. When the talk button 167 is pressed at a terminal device 101, the terminal device 101 sends message J11, which is a SIP REFER message. The IMS core 203A forwards message J11 to PoC server which transmits message J13 that is RTCP: Floor taken message to the other terminal device 101B. The other terminal device 101B indicates that it is now listening to the terminal device 101; e.g., by playing a suitable acoustic signal.

The PoC server 201 responds with message J15 that is RTCP: Floor Granted. Then, the terminal device 101 indicates to the user that he or she can now talk; e.g., by playing a suitable acoustic signal. The PoC furthermore sends an SIP 202 message to the terminal device 101.

Speech packets MN1 coded at the terminal device 101 are transmitted as RTP: Talk bursts through the IMS core 203A to the PoC server 201. The PoC server 201 forwards them as speech packets MN2, transmitting them as RTP: Talk bursts to the other terminal device 101B through the IMS core 203B. The other terminal device 101B receives the speech packets MN2, decodes them, and converts them to an audible form so that the user of the other terminal device 101B can hear a reproduction of the speech coded by the terminal device 101.

When talk button 167 is released at the terminal device 101, the terminal device sends message J21 that is RTCP: Floor release message. The PoC server 201 sends message J23 that is RTCP: Floor idle message to the other terminal device 101B. The other terminal device indicates to the user that the floor is now idle; i.e., that he or she may press the push button 167 of his or her terminal device 101B.

The PoC server 201 responds with SIP NOTIFY, and the terminal acknowledges by sending SIP 200 OK message. The PoC server 201 responds once more by sending message J25 that is RTCP:

Floor idle message.

FIG. 5 shows late media and manual answer for one-to-one communication using PoC. Now responsive to terminal device 101 detecting a pressing of talk button 167, it sends message J11 that is SIP INVITE to IMS core 203A. The IMS core 203A forwards the SIP INVITE to PoC server 201 that sends message J13 that is SIP invite to IMS core 203B. The IMS core 203B forwards the SIP INVITE to the other terminal device 101B, and passes SIP 100 Trying message to PoC server which forwards it through the IMS core 203A to the terminal device 101.

Upon receiving SIP INVITE, the other terminal device 101B indicates that a talk is intented, such as by playing a suitable audible signal, and passes SIP 180 Ringing message through the IMS core 203B, the PoC server 201, and the IMS core 203A to the terminal device 101. The terminal device 101 alerts the user.

When a user of the other terminal device 101B accepts the talk, such as by pressing a suitable button, the other terminal 101B transmits SIP 200 OK message through the IMS core 203B to the PoC server 201 which then sends message J15 which is RTCP: Floor granted message to the terminal device 101. The SIP 200 OK is furthermore passed to the terminal device 101, after which the terminal device 101 alerts the user. Some acknowledgements and other SIP messages furthermore may be transmitted. The transmission of speech packets in messages MN1 and MN2 nevertheless takes place in a very similar manner than in the example discussed with reference to FIG. 4.

Figure 6A:
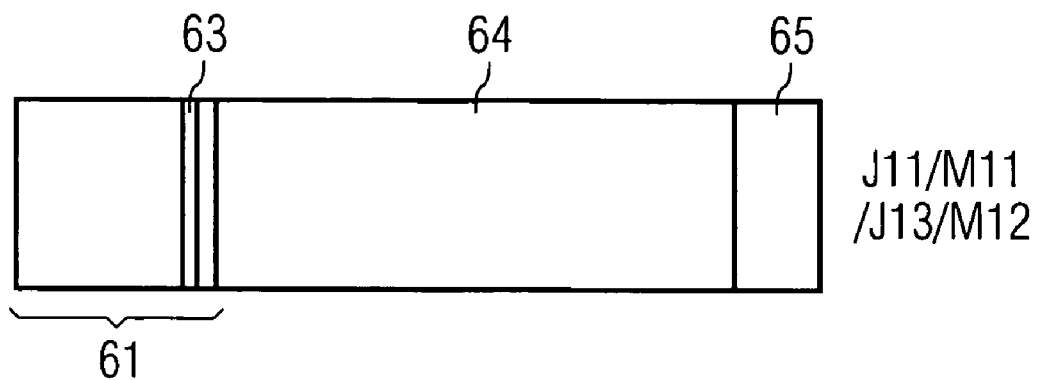
FIGS. 6A and 6B illustrate possible structures of the message carrying geographical location information.
Figure 6B:
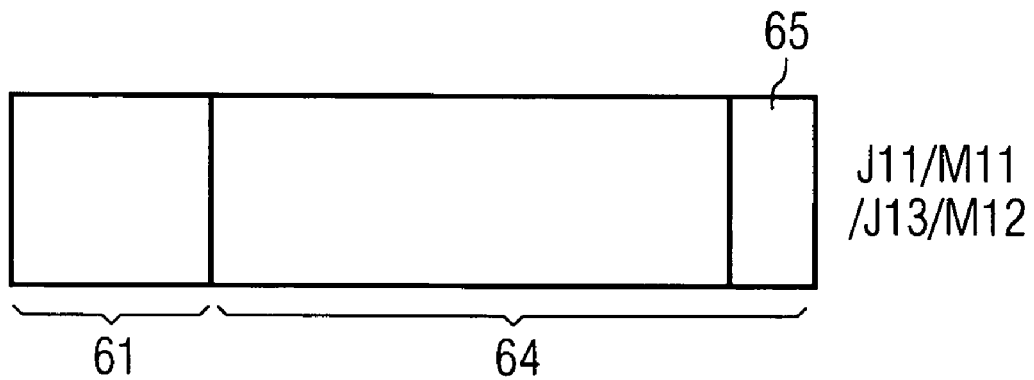

FIGS. 6A and 6B illustrate possible structures of the message carrying geographical location information. The message can be J11 (signalling from terminal device 101 to the PoC server 201 that a talk button 167 has been pressed), M11 (any speech packet or particularly the first speech packet from the terminal device 101), J13 (signalling from PoC server 201 to the other terminal device 101B that a talk button 167 has been pressed at the terminal device 101), or M12 (any speech packet or particularly the first speech packet from the PoC server 201 to the other terminal device 101B).

The first terminal device 101 finds out its geographical location 65. For doing this, it may use any suitable locationing method. Currently, terminal devices with assisted Global Positioning System A-GPS receivers are under development. A-GPS enables quick & accurate location finding for the terminal device.

When the user of the first terminal device 101 pushes the talk button 167 in order to use the push-to-talk service, the first terminal device 101 requests the network for a permission to speak, and finally the push-to-talk message is generated by coding microphone input. The request for a permission to speak (message J11) or any of the speech messages (MN1, especially M11) may include the geographical location information 65.

As shown in FIG. 6A, the push-to-talk message J11, M11, J13, or M12 may include a flag 63 "location information present" in the header field 61 indicating that the geographical location 65 follows. As an alternative, as illustrated in FIG. 6B, the least-significant bits of the speech message 64 having coded speech may be used to indicate the geographical location 65. The latter possibility enables a proprietary solution.

The other terminal device 101B receives the push-to-talk message. After checking the flag 63 in the header field 61 or the least significant bits 65, an application, such as the PoC application 165, extracts the geographical location information 65.

The other terminal device 101B knows its own geographical location 65B.

The other terminal device 101B compares its own geographical location 65B with the geographical location 65 of the terminal device 101. Information based on a comparison result is shown to the user of the other terminal device 101B. This information may include any of the following: direction of the terminal device 101 (may require use of a digital compass in the other terminal device 101B); distance of the terminal device 101 from the other terminal device 101B; show on a map the geographical location 65 of terminal device 101 vs. its own geographical location 65B; or just displaying the geographical location 65 of terminal device 101 vs. its own geographical location 65B.

It is by no means necessary that the geographical location 65 is received as such at the other terminal device 101B. The other terminal device 101B may transmit, such as by responding to any one of messages J13 or MN2 (particularly M12) its own geographical location 65B to a network unit; e.g., to the PoC server 201 which then computes the difference and transmits information based thereon to both the terminal device 101 and the other terminal device 101B.

The terminal device 101, for example, in one of its applications, such as the PoC application 165, may have a settings menu for setting a "push-to-talk" item, under which a user can tick on/off the following items:

send own location with push-to-talk; and
show talking party's direction/location.

In other words, the user sending his or her own location has full control over whether or not the location is to be sent or, as described above, the parents or employer, for example, can control the transmission of the geographical location information.

Although the present invention has been described with reference to specific embodiments, those of skill in the art will recognize that changes may be made thereto without departing from the spirit and scope of the present invention as set forth in the hereafter appended claims.

The invention claimed is:

1. A method for receiving location information, the method comprising:
receiving a Push-to-Talk over Cellular message (PoC) at a first PoC terminal device indicating that a user of a second PoC terminal device has pressed a PoC talk button, the message including a geographical location of the second PoC terminal device;
indicating the geographical location of the second PoC terminal device to a user of the first PoC terminal device;
indicating a direction of the first PoC terminal device from the geographical location of the second PoC terminal device;
indicating a distance of the first PoC terminal device from the second PoC terminal device;
indicating a geographical location of the first PoC terminal device on a map together with the geographical location of the second PoC terminal device; and
indicating coordinates of both the first PoC terminal device and the second PoC terminal device.

2. A method for receiving location information as claimed in claim 1, wherein the Push-to-Talk over Cellular message is one of a REFER message and a Floor taken message.

3. A method for transmitting location information, the method comprising:
determining whether a parameter controllable by a user of a first PoC terminal device allows for indicating a geographical location of the first PoC terminal device to another PoC terminal device to which a message maybe sent;
writing information into the message, in response to the user of the first PoC terminal device pressing a PoC talk button, the information indicating the user pressed the PoC talk button and, only if the parameter allows, indicating the geographical location of the first PoC terminal device wherein the information describing the geographical location of the first PoC terminal device is written, into the message only if a parameter controllable by the user of the first PoC terminal device shows that the geographical location is indictable; and
transmitting the message to one of a second PoC terminal device and a communications network.

4. A method for transmitting location information as claimed in claim 3, wherein the message is a Push-to-Talk over Cellular message.

5. A method for transmitting location information as claimed in claim 4, wherein the Push-to-Talk over Cellular message is one of a REFER message and a Floor taken message.

6. A PoC terminal device, comprising:
a receiver, the receiver receiving a PoC message indicating, that a user of a further PoC terminal device has pressed a PoC talk button, the PoC message including a geographical location of the further PoC terminal device; and
an indicator, the indicator indicating the geographical location of the further PoC terminal device to a user of the PoC terminal device, the indicator additionally indicating at least one of:
a direction of the PoC terminal device from the geographical location of the further PoC terminal device;
a distance of the PoC terminal device from the further PoC terminal device;
a geographical location of the PoC terminal device on a map together with a geographical location of the further PoC terminal device; and
coordinates of both the PoC terminal device and the further PoC terminal device,
wherein the PoC message includes the geographical location of the further PoC terminal device and the indicator only if a parameter controllable by the user of the further PoC terminal device shows that the geographical location is indictable.

7. A PoC terminal device as claimed in claim 6, wherein the Push-to-Talk over Cellular message is a Floor taken message.

8. A PoC terminal device, comprising:
a parameter under control of a user of the PoC terminal device for determining whether the PoC terminal device allows for indicating a geographical location of the PoC terminal device to another PoC terminal device to which a message is to be sent;
a message generator, the message generator writing-information into the message, responsive to a user of the PoC terminal device pressing a PoC talk button, the information indicating the user pressed the PoC talk button and, only if the parameter allows, indicating the geographical location of the PoC terminal device, wherein the information describing the geographical location of the PoC terminal device is written into the message only if a parameter controllable by the user of the PoC terminal device shows that the geographical location is indictable; and
a transmitter, the transmitter transmitting the message to one of a further PoC terminal device and a communications network.

9. A PoC terminal device as claimed in claim 8, wherein the message is a Push-to-Talk over Cellular message.

10. A PoC terminal device as claimed in claim 9, wherein the Push-to-Talk over Cellular message is a REFER message.

* * * * *